(12) United States Patent
Stimpfl

(10) Patent No.: US 7,166,021 B2
(45) Date of Patent: Jan. 23, 2007

(54) METHOD AND APPARATUS FOR LOADING AND/OR UNLOADING A STORAGE UNIT

(76) Inventor: Christof Stimpfl, Hoferweg 2, 88267 Vogt (DE)

( * ) Notice: Subject to any disclaimer, the term of this patent is extended or adjusted under 35 U.S.C. 154(b) by 2 days.

(21) Appl. No.: 11/197,150

(22) Filed: Aug. 3, 2005

(65) Prior Publication Data

US 2006/0035575 A1 Feb. 16, 2006

(51) Int. Cl.
*A22C 11/00* (2006.01)
(52) U.S. Cl. .......................................................... 452/32
(58) Field of Classification Search ........ 452/120–123, 452/161, 65, 54, 66–68, 50, 30–32
See application file for complete search history.

(56) References Cited

U.S. PATENT DOCUMENTS

| | | | | |
|---|---|---|---|---|
| 3,792,508 A | * | 2/1974 | Simonsen et al. | ............. 452/51 |
| 3,936,900 A | * | 2/1976 | Bende | .......................... 15/3.12 |
| 4,612,684 A | * | 9/1986 | Kollross | ....................... 452/35 |
| 5,100,364 A | * | 3/1992 | Kollross et al. | ............. 452/185 |

FOREIGN PATENT DOCUMENTS

| | | |
|---|---|---|
| DE | 221 978 | 5/1985 |
| DE | 250 627 | 10/1987 |

* cited by examiner

*Primary Examiner*—Thomas Price
(74) *Attorney, Agent, or Firm*—Bachman & LaPointe, P.C.

(57) ABSTRACT

An apparatus and a method for loading and/or unloading a storage unit, in particular smoke trucks in which sausages are suspended by strings from sticks (1), a plurality of sticks (1) with sausages preferably being held by grip arms (2.1, 2.2) and introduced into the storage unit or removed from the storage unit and delivered to a cutting device (30).

10 Claims, 2 Drawing Sheets

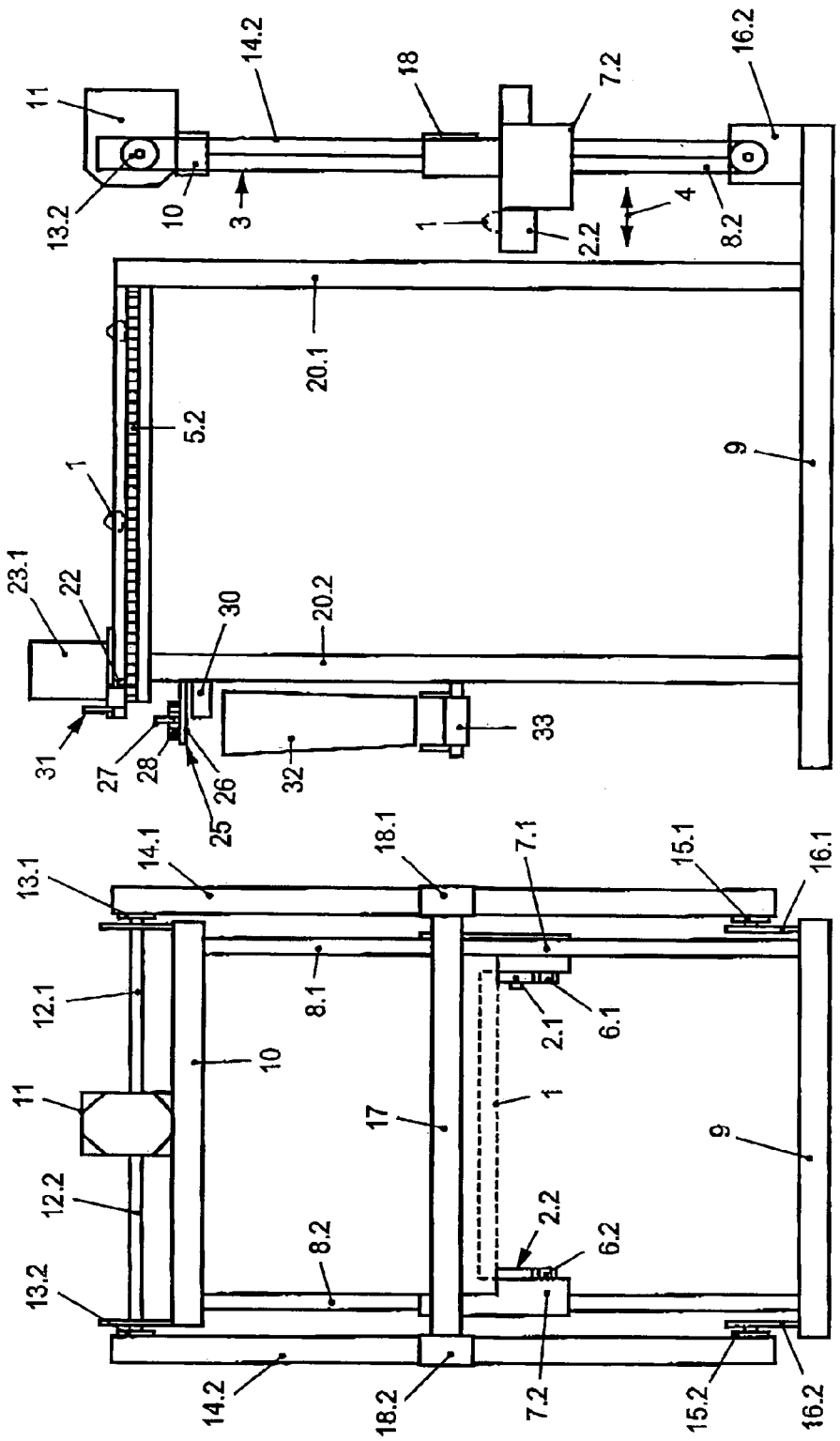

METHOD AND APPARATUS FOR LOADING AND/OR UNLOADING A STORAGE UNIT

BACKGROUND OF THE INVENTION

The invention relates to a method for loading and/or unloading a storage unit, in particular smoke trucks in which sausages are suspended by strings from sticks, and also to an apparatus for carrying out this method.

It is known that sausage and meat products are suspended on smoke sticks and loaded into smoke trucks. The sausage and meat products generally hang from these smoke sticks by strings, as a result of which a smoke stick has a weight of several kilograms. Since the workers employed to load smoke trucks are usually females, lifting such a load is a considerable burden on the workforce.

DD 221 978 A1 discloses a method and an apparatus for mechanical loading of shelves, in particular smoke trucks, in which, by using a vertical circular conveyor, the rods fitted with sausage or meat products are conveyed into the corresponding levels of the smoke truck. This is followed by the positioning in the smoke truck and by the rods being deposited in the receiver profiles. For this purpose, a loading elevator is provided from which the smoke sticks are transferred to a charging device. From the charging device, the sticks are then transferred into the smoke trucks. To transfer the sticks from the loading elevator to the charging device, additional transport rails must be provided which, by means of a coordinated lifting/pushing movement, take the rod received from the loading elevator and transport it farther onto the profiled receiving arms. This is complicated. Moreover, the transport rails have to be precisely synchronized.

DD 250 627 A3 in turn discloses an apparatus for unloading smoke trucks. Here, a smoke spit is held by a gripping device and transported to the point of transfer on the unloading unit. This unloading unit grips the smoke spit, while the other unloading unit releases the smoke spit. The second unloading unit is then turned and drops the smoke spit onto the conveyor roller so that sausages suspended on the smoke spit slide into the meat container standing on the roller. However, this does not achieve anything more than unstringing of the sausages from the smoke spit. The strings remaining on the sausages can be very awkward, especially in subsequent packaging in tubular casings.

The object of the present invention is to develop a method and an apparatus of the above-mentioned type which not only permits automatic loading and unloading of sausages from a storage unit, but also accelerates this procedure and makes the sausages ready for subsequent processing.

SUMMARY OF THE INVENTION

The foregoing object is achieved by the present invention wherein a plurality of sticks with sausages are preferably held by grip arms and introduced into the storage unit or removed from the storage unit and delivered to a cutting device.

An important feature is the provision of the grip arms which engage under the smoke sticks. That is to say, a plurality of smoke sticks can be engaged simultaneously by the grip arms and introduced into the smoke truck or removed from the smoke truck. In this way, the loading and unloading procedure is speeded up considerably.

A further aspect of the invention concerns the automatic transport of the smoke sticks to a cutting device after unloading from the smoke truck. At this cutting device, the strings are severed such that they cannot subsequently interfere in a further processing operation.

In a preferred illustrative embodiment, the cutting device is assigned at least one sensor which detects a clip, the sausage tip and/or the string in its dimensioning. In a corresponding control system, the signals of this sensor are processed in such a way that the cutting device is controlled so as to be suitably raised or lowered, such that the string is cut at the desired height. For example, the cut can be made exactly at the height of the end of the sausage tip, so as to ensure that no string whatsoever protrudes beyond the sausage tip.

However, the scope of the invention is also intended to cover a situation where, if so desired, a clip can be removed for example.

In the apparatus according to the invention, vertically movable grip arms are arranged on columns and can be driven out horizontally, a cutting device being assigned to said grip arms.

The grip arms are in this case intended to be located, for example, on a gantry in which the columns are also provided. The grip arms are configured in such a way that they can be driven out of the gantry in both directions or, alternately, the grip arms can also be composed of a plurality of parts that can be driven out in the manner of a telescope. Many possibilities are conceivable here and are intended to be covered by the scope of the invention.

The grip arms are preferably assigned conveyor means which transport the removed smoke sticks to the cutting device. The conveyor means are configured such that they can be reached from the grip arms, i.e. the grip arms remove smoke sticks from the smoke truck and then transfer them to the conveyor means. For the sake of simplicity, endless chains are possible as the conveyor means. Depending on requirements, and on the arrangement of the apparatus, a plurality of conveyor means can be coupled in series so as to permit lengthwise delivery and crosswise delivery of the smoke sticks. It is important, simply, that the smoke sticks reach the cutting device as quickly as possible.

BRIEF DESCRIPTION OF THE DRAWINGS

Further advantages, features and details of the invention will become clear from the following description of preferred illustrative embodiments and from the drawing, in which:

FIG. 1 shows a front view of an apparatus according to the invention for loading and/or unloading of a storage unit;

FIG. 2 shows a side view of the storage unit according to FIG. 1;

DETAILED DESCRIPTION

Figure 3:
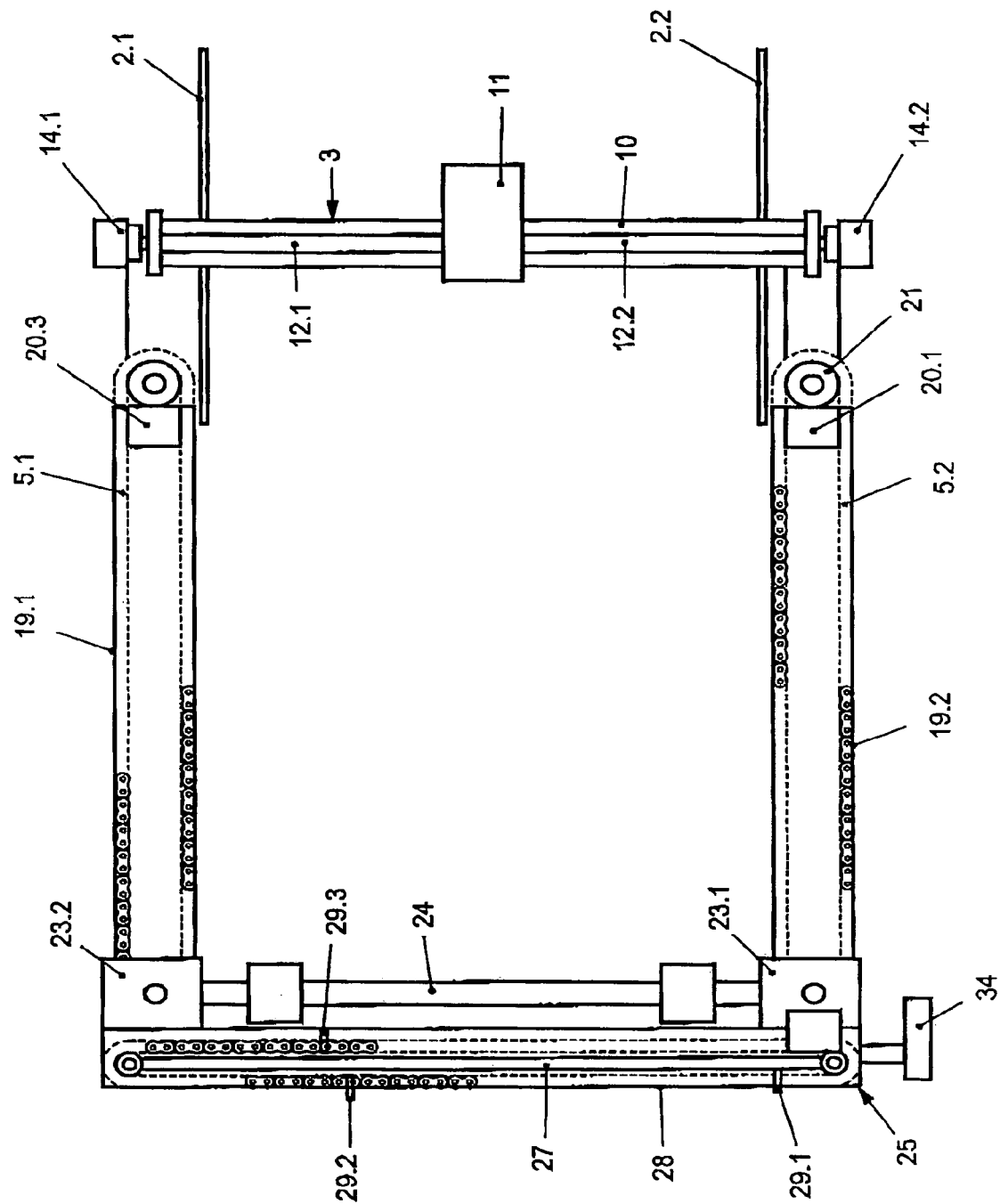
FIG. 3 shows a plan view of the storage unit according to FIG. 2.

The apparatus according to the invention, as shown in FIGS. 1 through 3, is used principally for loading and/or unloading of smoke trucks, these smoke trucks not being shown in the present case. The smoke trucks contain sausages which are suspended by strings from so-called smoke sticks 1. These smoke sticks 1 are indicated by dashed lines in the present case.

For loading and/or unloading smoke trucks of this kind, that is to say for manipulating the smoke sticks 1, the apparatus according to the invention comprises two grip arms 2.1 and 2.2 which are provided on a gantry 3. The grip arms 2.1 and 2.2 are strip-shaped and can be moved horizontally according to the double arrow 4 in FIG. 2. They are configured in such a way that at the front they can remove smoke sticks 1 from a smoke truck, move these through the gantry 3 and deposit them at the back onto horizontal conveyor chains 5.1 and 5.2.

The horizontal movement of the grip arms 2.1 and 2.2 is effected, for example, by toothed wheels 6.1 and 6.2 which engage in a toothed underside of the grip arm 2.1 and 2.2, respectively. It is also conceivable for the grip arm 2.1 and 2.2 to be designed in two parts, as is indicated in FIG. 1, such that the smoke stick 1 can be moved from a first part, which collects it from the smoke truck, onto a second part.

The grip arms 2.1 and 2.2 are situated on vertical slides 7.1 and 7.2 which extend along columns 8.1 and 8.2. These columns 8.1 and 8.2 are located between a base frame 9 and a crosspiece 10. A motor 11, sitting on the crosspiece 10, drives toothed wheels 13.1 and 13.2 via shafts 12.1 and 12.2 protruding on both sides.

Each toothed wheel 13.1 and 13.2 is looped by a toothed belt 14.1 and 14.2, said toothed belt 14.1 and 14.2 in each case being designed as an endless belt and running round a guide roller 15.1, 15.2 in the lower area. These guide rollers 15.1 and 15.2 are in each case connected to the base frame 9 by way of a bracket 16.1 and 16.2.

A transverse bar 17 is secured on the toothed belts 14.1 and 14.2 via connector pads 18.1 and 18.2 and is in turn connected to the vertical slides 7.1 and 7.2.

The conveyor chains 5.1 and 5.2 each lie on a supporting plate 19.1 and 19.2, respectively, each supporting plate 19.1 and 19.2 being arranged between two vertical posts 20.1 through 20.3. The vertical posts 20.1 through 20.3 in turn bear on the base frame 9.

Each conveyor chain 5.1, 5.2 is designed as an endless chain and loops round a guide wheel 21 and a drive wheel (not shown in detail) which is connected to a motor 23.1 via a shaft stub 22. The motor 23.1 is synchronized with a motor 23.2 for the drive chain 5.1 via a connecting shaft 24.

An inverted T-shaped profile 25 is arranged underneath the motors 23.1 and 23.2 in front of the vertical post 20.2 and in front of the vertical post (not shown) lying opposite the latter. In this way, the profile 25 forms a support surface 26 with an upwardly projecting central wall 27. This central wall 27 is looped by a further endless chain 28 on which stops 29.1 through 29.3 are fixed.

In the profile 25, on the vertical post 20.2, a cutting device 30 (indicated only schematically) is arranged which can preferably be moved vertically along the vertical post 20.2. For example, the cutting device 30 can comprise pneumatically activated scissors.

To hold a smoke stick 1 on the endless chain 28 during cutting, a holder 31 protrudes from the motor 23.1 and can be lowered onto the smoke stick 1 during use.

Provided underneath the cutting device 30 there is a funnel 32 via which sausages cut off from the smoke stick 1 can drop onto a conveyor belt 33. This funnel 32 is preferably displaceable, so that different sausages or different configurations of sausages on the smoke stick 1 can be dealt with.

To permit removal, from the apparatus, of the smoke sticks 1 from which sausages have been detached, a guide roller 34 is also provided, which is shown only in FIG. 3.

The present invention functions as follows:

For loading a smoke truck, the smoke sticks 1, with sausages suspended from them, are engaged on the grip arms 2.1 and 2.2, which can be done in any desired manner. The smoke truck stands in front of the gantry 3. If the grip arms 2.1 and 2.2 are now moved vertically and driven out horizontally, the smoke sticks 1 can be introduced into the desired levels in the smoke truck. This can be done fully automatically using suitable light barriers and proximity switches.

For unloading, the smoke truck is again driven in front of the gantry 3. The grip arms 2.1 and 2.2 are raised to the height of the smoke sticks 1 to be removed by means of the toothed belts 14.1 and 14.2 via the vertical slides 7.1 and 7.2 and are then driven out horizontally for example via the toothed wheels 6.1 and 6.2. Thereafter, the grip arms are raised slightly farther so that they lift the smoke sticks 1 from their bearing points.

The grip arms are now drawn inward, and, as has been described above, the smoke sticks are moved through the gantry 3 into the inside of the apparatus. The grip arms 2.1 and 2.2 are then raised to the height of the conveyor chains 5.1 and 5.2. By means of the motors 23.1 and 23.2, the smoke sticks 1 are transported toward the profile 25 and are there transferred to the endless chain 28. This takes place exactly between two stops 29.1 through 29.3 which hold the smoke stick 1 between them in such a way that the strings, on which the sausages hang, are free at the bottom. For this reason, the stops protrude from the endless chain 28.

The smoke stick 1 is now delivered to the cutting device 20, and a corresponding sensor (not shown), for example on the motor 23.1, detects when an edge of the sausage begins, or how long the string is, or whether a clip is arranged on the sausage. This can all be taken into consideration when cutting off the sausage, so that the cutting device is raised to a height such that the string is cut off near the sausage edge. If the sausage is then later sealed for example in a casing, no excess string can show from the tubular casing or impair the seal.

The cut-off sausage then drops into the funnel 32 and onto the conveyor belt 33 and is conveyed to a further processing station. The smoke stick 1 is ejected farther from the apparatus by the respective stop 29.1 through 29.3 and guided out by the guide roller 34.

The invention claimed is:

1. A method for loading and/or unloading smoke trucks, comprising suspending sausages by strings from sticks (1), holding a plurality of sticks (1) with sausages by grip arms (2.1, 2.2) introducing into and removing from the smoke truck the sticks, and delivering the sausages to a cutting device (30).

2. The method as claimed in claim 1, wherein, after the removal, the sticks (1) with the suspended sausages are delivered via conveyor means (5.1, 5.2, 28) to the cutting device (30) where the strings are severed.

3. The method as claimed in claim 2, including detecting one of a sausage tip band, the strings and a clip and controlling the action of the cutting device (30) in response to the detection.

4. An apparatus for loading and/or unloading smoke trucks, comprising suspending sausages by strings from sticks (1), providing vertically movable grip arms (2.1, 2.2) on columns (8.1, 8.2) for holding a plurality of sticks, means for moving the grip arms, and providing a cutting device (30) associated with the grip arms (2.1, 2.2).

5. The apparatus as claimed in claim 4, wherein the means for moving the grip arms (8.1, 8.2) can be driven horizontally both out of and also into the apparatus.

6. The apparatus as claimed in claim 5, wherein the grip arms (8.1, 8.2) are associated with conveyor means (5.1, 5.2, 28) for conveying the sausages on the sticks (1) to the cutting device (30).

7. The apparatus as claimed in claim 6, wherein the conveyor means (5.1, 5.2, 28) permit lengthwise and/or crosswise transfer of the sticks (1).

8. The apparatus as claimed in claim 6, wherein the conveyor means are horizontal endless chains (5.1, 5.2, 28).

9. The apparatus as claimed in claim 6, wherein the cutting device (30) can be moved vertically.

10. The apparatus as claimed in claim 9, wherein the cutting device (30) is associated with at least one sensor for detecting at least one of the string, a clip and an edge of the sausage.

* * * * *